United States Patent [19]

Phillips

[11] Patent Number: 4,543,357

[45] Date of Patent: Sep. 24, 1985

[54] 3-TRICHLOROMETHYL-5-SUBSTITUTED-1,2,4-THIADIAZOLES AS RUMINANT ANIMAL GROWTH PROMOTERS

[75] Inventor: Dorothy J. Phillips, Norwood, Mass.

[73] Assignee: The Dow Chemical Company, Midland, Mich.

[21] Appl. No.: 565,992

[22] Filed: Dec. 27, 1983

[51] Int. Cl.$^4$ .......................................... A61K 31/425
[52] U.S. Cl. ..................................................... 514/361
[58] Field of Search ........................................ 424/270

[56] References Cited

U.S. PATENT DOCUMENTS

| | | | |
|---|---|---|---|
| 3,260,588 | 7/1966 | Schroeder | 71/2.5 |
| 3,260,725 | 7/1966 | Schroeder | 424/270 |
| 3,522,353 | 7/1970 | Marco et al. | 424/317 |
| 3,564,098 | 2/1971 | Erwin et al. | 424/317 |
| 3,615,649 | 10/1971 | Parish et al. | 424/304 |
| 3,639,621 | 2/1972 | Parish et al. | 424/304 |
| 3,745,221 | 7/1973 | Parish et al. | 424/342 |
| 3,862,333 | 1/1975 | Chalupa et al. | 424/353 |
| 4,192,889 | 3/1980 | Hauck et al. | 424/309 |
| 4,268,510 | 5/1981 | Boyle et al. | 424/248.53 |
| 4,282,228 | 8/1981 | DeGeeter | 424/251 |
| 4,289,784 | 9/1981 | Bochis et al. | 424/274 |
| 4,333,923 | 6/1982 | Beck et al. | 424/115 |
| 4,333,952 | 6/1982 | McDonald | 424/330 |
| 4,337,081 | 6/1982 | Gay | 71/90 |
| 4,393,046 | 7/1983 | Baylis et al. | 424/117 |
| 4,393,065 | 7/1983 | DeGeeter | 424/251 |

FOREIGN PATENT DOCUMENTS 1502116  2/1978  United Kingdom ................ 424/278

OTHER PUBLICATIONS

*Journal of Animal Science*, vol. 50, No. 6, 1980, pp. 1160–1164.
*Applied and Environmental Microbiology*, Feb. 1979, pp. 283–288.
*Nature*, vol. 234, Dec. 31, 1971, pp. 551–552.
*Journal of Animal Science*, vol. 51, No. 1, 1980, pp. 170–179.
"Dwell TM Nitrification Inhibitor Technical Information Sheet", p. 4.
"Terrazole ® Technical—Data Sheet", 2–78, (Rev.).
*J. Agr. Food Chem.*, 20(6), pp. 1284–1286, (1972).

*Primary Examiner*—Frederick E. Waddell

[57] ABSTRACT

Use of 3-trichloromethyl-5-substituted-1,2,4-thiadiazoles or physiologically acceptable salts thereof are disclosed for increasing the efficiency of rumen fermentation in ruminant animals. Increasing the efficiency of rumen fermentation is known to increase the efficiency of feed utilization and/or increase the rate of growth of said animals. Also disclosed are feed compositions and concentrates containing 3-trichloromethyl-5-substituted-1,2,4-thiadiazoles or physiologically acceptable salts thereof.

9 Claims, No Drawings

3-TRICHLOROMETHYL-5-SUBSTITUTED-1,2,4-THIADIAZOLES AS RUMINANT ANIMAL GROWTH PROMOTERS

BACKGROUND OF THE INVENTION

The metabolism of feed by ruminant animals such as cattle, sheep and goats having a developed rumen function has been a target of intensive investigation in recent years. It has been discovered that by improving the efficiency of rumen fermentation, a corresponding increase in the rate of growth and/or an increase in the efficiency of feed utilization by the animals will occur.

The overall efficiency of rumen fermentation is a function of the symbiotic activities of the microbial species inhabiting the rumen. These microbial species are responsible for the transformation of carbohydrates as well as protein and nonprotein nitrogenous substrates into forms such as microbial cell protein and volatile fatty acids suitable for biochemical utilization by the ruminant animal. The exact composition of the end products is a consequence of competition between the microbial species for the substrates or nutrients. The efficiency of the rumen fermentation is an important factor in determining the degree of feed utilization efficiency and/or the rate of growth of the animal.

For example, during nitrogen metabolism, a portion of the feed protein (depending on the type of protein) is hydrolyzed by microbial enzymes in the rumen to ammonia and isoacids which are subsequently fixed into microbial protein. Other proteins from feed sources are metabolized to peptides and free amino acids. The peptides may subsequently be transformed into free amino acids by certain ruminal bacteria (for example, *Bacteroides ruminicola*) leaving a pool of free amino acids which may then be assimilated into microbial protein or catabolized to produce energy for microbial growth. The free amino acids may also be assimilated directly by the animal and used for protein synthesis or catabolized as a source of energy.

Carbohydrate metabolism provides energy for the growth of rumen microbes primarily through the fermentation of cellulose and starch. The insoluble polymers are converted to oligosaccharides and soluble sugars by extracellular enzymes from the rumen microorganisms. The resulting sugars are then fermented to one of various forms of volatile fatty acids, carbon dioxide and hydrogen. As used herein, the volatile fatty acids - acetic acid, propionic acid and butyric acid - are also referred to as acetate, propionate and butyrate, respectively. Volatile fatty acids are utilized by the animal as primary carbon and energy sources with varying degrees of efficiency. High levels of propionic acid are desirable because propionic acid is a primary metabolic precursor for gluconeogenesis in the animal. The fermentation of 6-carbon sugars to acetic acid is relatively inefficient since in this process, carbon is lost via eructation in the form of carbon dioxide or methane. On the other hand, the production of propionic acid does not result in a loss of carbon.

Rumen metabolism studies have shown that some of the rumen microbes such as various Ruminococcus and Butyrivibrio species ferment the monosaccharides of complex carbohydrates to formic, acetic, butyric and succinic acids, along with carbon dioxide and hydrogen. The carbon dioxide and hydrogen produced during fermentation are used in the formation of methane through the activity of methanogenic bacteria. Rumen microorganisms such as various Bacteroides species ferment carbohydrates predominantly to succinic acid which is converted to the desirable propionic acid by various Selenomonas species or other microorganisms.

It becomes possible then to improve feed utilization efficiency and/or the rate of growth of ruminant animals by selectively inhibiting or stimulating the growth of ruminal microflora involved in rumen fermentation. For instance, feed utilization efficiency and/or rate of growth can be improved by increasing the molar proportion of propionic acid to acetic acid or by increasing total volatile fatty acid concentration (i.e. the sum of acetic, propionic and butyric acids) in the rumen. For example, an increase in the molar portion of propionic acid can be accomplished by selectively inhibiting the growth of various species of Ruminococcus and Butyrivibrio and by stimulating the growth of various species of Bacteroides and Selenomonas. Likewise, it is also known that inhibiting methanogenesis in the rumen results in an apparent decrease in gaseous loss of methane via eructation and a shift toward producing more desirable fatty acids for growth, especially propionic and butyric acids. See U.S. Pat. Nos. 3,745,221; 3,615,649; and 3,862,333. Higher levels of the metabolic end products of feed protein degradation (such as ammonia and isoacids) can lead to such beneficial effects as a stimulation of microbial protein synthesis. In addition, a partial inhibition of the deamination activity of the rumen microflora makes more of the amino acids available for the nutrition of the animal.

SUMMARY OF THE INVENTION

The present invention is directed to a method of improving the efficiency of rumen fermentation of ruminant animals having a developed rumen function. Improving the efficiency of rumen fermentation improves the efficiency of feed utilization and/or the rate of growth of ruminant animals. Such improvement is attained by oral administration to said animals of at least one compound corresponding to the formula:

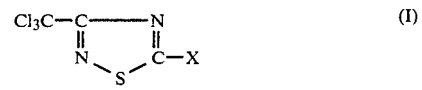

wherein X is selected from the group consisting of chloro, $NH_2$, NHR, $NR_2$, OR and SR where R is alkyl, and physiologically acceptable salts thereof. The compounds of formula I are known compounds and are disclosed and claimed in U.S. Pat. No. 3,260,725 issued July 12, 1966 to Schroeder which is incorporated herein by reference.

A preferred compound of formula I for use in the method and compositions disclosed herein is 3-trichloromethyl-5-ethoxy-1,2,4-thiadiazole (alternatively referred to herein as estridiazol).

As used herein, the term "alkyl" refers to aliphatic, straight or branched chain radicals of from 1 to about 4 carbon atoms inclusive. As used herein, the term "physiologically acceptable" when used in conjunction with the salts of a compound of formula I refers to those salts which will not cause significant adverse physiological effects when administered to an animal at dosages consistent with the method of the present invention. Such physiologically acceptable salts of the compounds of formula I are readily prepared using conventional techniques by one of ordinary skill in the art.

One or more of the compounds of formula I or physiologically acceptable salts thereof is administered in an effective amount sufficient to increase rumen fermentation efficiency which will provide an improvement in feed utilization efficiency and/or rate of growth in ruminant animals in need thereof. For purposes of this invention, the amount of a compound of formula I or physiologically acceptable salts thereof to be administered may range from about 0.1 milligram (mg) per kilogram (kg) of ruminant animal body weight per day to about 4 mg per kg of ruminant animal body weight per day, with a preferred range of from about 0.2 mg per kg of ruminant animal body weight per day to about 3 mg per kg of ruminant animal body weight per day. The exact amount of one or more compounds of formula I or physiologically acceptable salts thereof to be employed will vary depending upon factors such as the species of animal, or the size, weight, age, and health of the animal. In particular cases, the concentration to be administered may be determined by conventional dose titration techniques.

When administered to a ruminant animal, consistent with the method disclosed herein, the compounds of formula I and physiologically acceptable salts thereof improve the efficiency of rumen fermentation by inhibiting the deamination of amino acids. Such inhibition of deamination increases the availability of amino acids to the animal for protein and glucose synthesis. Further, the compounds of formula I and physiologically acceptable salts thereof inhibit the production of methane in the rumen. Typically, in those instances where methane production is not inhibited, the animal loses most of the methane produced and all of the associated energy by the process of eructation. However, when methanogenesis is inhibited, the carbon and hydrogen utilized in the production of methane may be more beneficially used in the production of volatile fatty acids, the major energy source for the animal.

Stimulation of total volatile fatty acid production and increased availability of nitrogen may also lead to an increase in milk production in lactating ruminants thus benefiting industries such as the dairy industry.

DETAILED DESCRIPTION OF THE INVENTION

The method of the present invention involves the administration of a compound of formula I or physiologically acceptable salts thereof to ruminant animals having a developed rumen function. The novel method of the present invention is equally applicable to all of the ruminant animals, however, the greatest impact from this invention should be realized in those industries involved with economically important ruminants such as cattle. For example, due to improved rumen fermentation, beef producing cattle treated in accordance with the method of the present invention will exhibit an improved rate of growth and/or will consume less feed per unit of weight gain.

One or more compounds of formula I or physiologically acceptable salts thereof may be incorporated into animal feed at a concentration of from about 3 to about 200 parts per million (ppm) by weight of the ultimate composition. Preferably, for ruminant animals, one or more compounds of formula I, or physiologically acceptable salts thereof may be incorporated into standard ruminant animal feeds at a concentration of from about 7 to about 165 ppm by weight of the ultimate composition, and especially preferred for ruminant animals in the range of from about 15 to about 110 ppm by weight of the ultimate composition. Alternatively, it may be added to drinking water or administered in the form of boluses, liquid feed compositions or incorporated into salt blocks. It may also be administered as an emulsion, suspension, tablet, capsule or any other appropriate veterinary dosage form in either single dose increments or in sustained release form. The incorporation of compounds such as those compounds of formula I into suitable dosage forms is well known in the pharmaceutical sciences. The method of this invention includes the incorporation of one or more of the compounds of formula I or physiologically acceptable salts thereof into suitable dosage forms together with any additional diluents, adjuvants, excipients, fillers, stabilizers, disintegrators, matrixes, polymers, emulsifying and suspending agents or any other pharmaceutical vehicle or ingredients necessary to a finished dosage form.

For commercial use it is convenient to provide a feed additive premix, mineral supplement or concentrate containing one or more of the compounds of formula I or physiologically acceptable salts thereof in a proportion such that a predetermined quantity of the premix or concentrate may be added to a quantity of standard ruminant animal feed. The feed additive premix or concentrate comprises one or more of the compounds of formula I or physiologically acceptable salts thereof along with physiologically acceptable adjuvants and carriers such as soybean meal, ground corn, ground corn cobs, corn oil, barley, wheat or other edible feed grade material, mineral or vitamin mixtures, or an innocuous diluent such as an alcohol, a glycol or molasses which may be suitable for the particular animals being treated. For these purposes, the premix or concentrate may contain from about 0.05 to about 80 percent by weight and preferably from about 1 to about 40 percent by weight of one or more of the compounds of formula I or physiologically acceptable salts thereof in admixture with a suitable adjuvant such as previously described. Crampton, et al. (*Applied Animal Nutrition*, 1969) and Church (*Livestock Feeds and Feeding*, 1977) further describe the process of admixing compounds such as those of formula I into feed compositions, premixes and concentrates and are incorporated herein by reference.

The method of the present invention further contemplates treating a ruminant animal with one of the novel compositions containing one or more of the compounds of formula I or physiologically acceptable salts thereof in combination with one or more additives such as coccidiostats, antibiotics, minerals, vitamins or any other physiologically benefical agents employed in animal husbandry.

The following examples are set forth as a means of illustrating the present invention and are not to be construed as a limitation thereon.

EXAMPLE 1

Fermentation Medium Preparation

A fermentation medium useful for carrying out the evaluations described herein was prepared by the admixture of the following ingredients:

| | |
|---|---|
| Mineral solution 1 | 7.5 ml |
| Mineral solution 2 | 7.5 ml |

-continued

| | |
|---|---|
| Micromineral solution | 1.5 ml |
| Resazurin solution 0.1% | 0.1 ml |
| Clarified rumen fluid | 10.0 ml |
| NaHCO3 (6.33% solution) | 8.0 ml |
| Na2S.9H2O (2.5% solution) | 0.5 ml |
| Distilled water | 64.9 ml |
| | 100.0 ml |

To each 100 ml of the above preparation, 0.8 gram of dry nutrients was added. The dry nutrients consisted of 0.3 gram of Avicel ® PH 101-microcrystalline cellulose, 0.3 gram of casein, and 0.1 gram each of anhydrous glucose and soluble starch. The pH of the medium was checked and adjusted to pH 6.8–7.2 with $CO_2$.

The clarified rumen fluid of the fermentation medium was prepared by collecting rumen fluid from an untreated fistulated cow on a hay diet approximately 12 hours after feeding. The fluid was strained through gauze and centrifuged at 5,000 rpm. The supernatant was placed in one liter amber bottles (about 400 ml/bottle) and autoclaved at about 15 pounds of pressure for sterilization.

All of the solutions of the fermentation medium were added as prepared stock solutions of the following compositions (in grams per liter of water):

| | grams/liter |
|---|---|
| Mineral Solution 1 | |
| $K_2HPO_4$ | 12.5 |
| Mineral Solution 2 | |
| $KH_2PO_4$ | 12.5 |
| $MgSO_4.7H_2O$ | 3.0 |
| NaCl | 12.0 |
| $CaCl_2.2H_2O$ | 1.6 |
| Micro-Mineral Solution | |
| $FeSO_4.7H_2O$ | 0.200 |
| $H_3BO_3$ | 0.030 |
| $CoCl_2.6H_2O$ | 0.020 |
| $ZnSO_4.7H_2O$ | 0.010 |
| $MnCl_2.4H_2O$ | 0.003 |
| $Na_2MoO_4.2H_2O$ | 0.003 |
| $NiCl_2.6H_2O$ | 0.002 |
| $CuCl_2.2H_2O$ | 0.001 |
| (pH adjusted to about 2) | |
| Resazurin Solution 0.1% | |
| Resazurin | 1.0 |
| Sodium Bicarbonate Solution 6.33% | |
| $NaHCO_3$ | 63.3 |
| (saturated with, and stored under 100% $CO_2$) | |
| Sodium Sulfide Solution 2.5% | |
| $Na_2S.9H_2O$ | 25.0 |
| (stored under nitrogen) | |

EXAMPLE 2

In vitro evaluations of estridiazol were carried out in 24 hour batch fermentations in anaerobic digestors having gas and liquid sampling ports and manometers to measure total gas production during the fermentation. Three different concentrations of estridiazol (2.0, 10.0 and 20.0 ppm) were prepared in 10 percent methanol solutions and placed in three separate groups of digestors. Fresh rumen fluid (700 ml) from an untreated fistulated cow was added to 1300 ml of the fermentation medium described in Example 1 and mixed. After mixing, 10 ml was removed and analyzed as a control, and 200 ml was placed in each of the digestors. The manometers were attached and nitrogen was bubbled through to remove oxygen. The digestors were then maintained at 40° C. while under continuous agitation.

The cultures were sampled at 0, 5 and 24 hours. The 5 hour sample was used primarily to note effects on nitrogen metabolism. Measurement of the change in concentration of protein, amino acids and ammonia in the fermentation after 5 hours was an indication of the extent to which the rate of protein degradation and deamination were inhibited by estridiazol. Concentrations of isoacids, i.e. iso-butyric, iso-valeric and valeric acids were determined at 24 hours and used as a measure of inhibition of deamination since the major source of these acids is the deamination of the amino acids valine, leucine and proline, respectively.

The 24 hour sample was used to measure volatile fatty acid production. The mole ratio of acetate to propionate (A/P) was used to determine if estridiazol increased the molar proportion of propionate in total volatile fatty acid concentrations. The gas composition was also determined at 24 hours and the amount of methane produced was noted. The rate at which gas was produced was determined by reading the manometers hourly at 3, 4 and 5 hours to monitor microbial metabolism. The results of these in vitro fermentations are set forth in Table 1 below, and are expressed as a percent of control.

The data in Table 1 clearly indicate that at 20 ppm, estridiazol (relative to control) produced a 99 percent inhibition of methane production (expressed in the table as 1 percent of control), and inhibited deamination to give a 77 percent increase in amino nitrogen. Further, a 44 percent decrease in the ammonia nitrogen pool was observed as well as a 37 percent depression of acetate production resulting in a 43 percent lowering of the acetate to propionate ratio. Similar effects were noted at 10 ppm of estridiazol, and even at a rate as low as 2 ppm, inhibition of deamination and protein degradation was observed. At all concentrations of estridiazol administered, butyrate levels increased, including a 32 percent increase at the 2.0 ppm rate.

TABLE 1

| | In Vitro Evaluation of Estridiazol[a] | | | | | | | | | | |
|---|---|---|---|---|---|---|---|---|---|---|---|
| Concentration | Gas Rate | Methane | Protein Degradation | Amino—N | Ammonia—N | Isoacids[b] | Acetate | Pro-pionate | Butyrate | Total VFA[c] | A/P[d] |
| 2.0 ppm | 100 | 91 | 74 | 131 | 89 | 114 | 105 | 107 | 132 | 107 | 98 |
| 10.0 ppm | 62 | 3 | 76 | 166 | 58 | 97 | 60 | 108 | 164 | 84 | 55 |
| 20.0 ppm | 74 | 1 | 74 | 177 | 56 | 97 | 63 | 110 | 142 | 85 | 57 |

[a]The values given represent percent of control (i.e., a number greater than 100 represents an increase in the indicated parameter relative to control; a number smaller than 100 represents a decrease in the indicated parameter relative to control).
[b]Isoacids = The sum of iso-butyric, iso-valeric and valeric acid concentrations.
[c]Total VFA = Total Volatile Fatty Acid (i.e., the sum of acetate, propionate and butyrate concentrations).
[d]A/P = Mole ratio of acetate to propionate.

EXAMPLE 3

Ruminant Feed Containing Estridiazol for Cattle on an Intermediate Diet

The following ingredients constitute a typical feed for cattle on a intermediate diet:

| Ingredient | Percent by Weight of Total Feed Composition |
|---|---|
| Dehydrated Alfalfa Meal | 25.0 |
| Cottonseed Hulls | 5.0 |
| Steamrolled Corn | 60.0 |
| Soybean meal (44%) | 3.0 |
| Calcium Carbonate | 1.0 |
| Sodium Tripolyphosphate | 0.5 |
| Cane Molasses | 5.0 |
| Trace Mineral Salts | 0.5 |

Estridiazol is added to the above feed at a rate of from about 3 to about 200 ppm by weight of the ultimate composition and then is fed to cattle as an intermediate or growing diet. After the intermediate diet a finishing diet is substituted until the cattle are ready for slaughter. When the above diet containing estridiazol is fed to cattle the feed utilization efficiency and/or rate of growth of the cattle is improved when compared to cattle on an equivalent diet but containing no estridiazol.

EXAMPLE 4

Ruminant Feed Containing Estridiazol For Cattle on a Finishing Diet

The following ingredients constitute a typical feed for cattle on a finishing diet:

| Ingredient | Percent by Weight of Total Feed Composition |
|---|---|
| Dehydrated Alfalfa Meal | 5.0 |
| Cottonseed Hulls | 10.0 |
| Steamrolled Corn | 74.8 |
| Soybean meal (44%) | 3.0 |
| Calcium Carbonate | 0.7 |
| Sodium Tripolyphosphate | 0.3 |
| Cane Molasses | 5.0 |
| Trace Mineral Salts | 0.5 |
| Urea | 0.7 |

Estridiazol is added to the above feed at a rate of from about 3 to about 200 ppm by weight of the ultimate composition and then is fed to cattle on a finishing diet. The finishing diet is fed to the cattle until time of slaughter. When the above diet containing estridiazol is fed to cattle the feed utilization efficiency and/or rate of growth of the cattle is improved when compared to cattle on an identical diet but containing no estridiazol.

In other representative operations, various 3-trichloromethyl-5-substituted-1,2,4-thiadiazoles described herein, are orally administered to ruminants whereby similar improvements in feed utilization efficiency and growth rate are achieved.

What is claimed is:

1. A method for improving the efficiency of rumen fermentation in ruminant animals which comprises administering to said animals a compound corresponding to the formula:

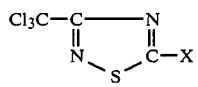

or a physiologically acceptable salt thereof wherein X is selected from the group consisting of chloro, $NH_2$, NHR, $NR_2$, OR and SR where R is a straight or branched chain alkyl moiety of 1 to about 4 carbon atoms inclusive; said compound or physiologically acceptable salt thereof administered to said animals in an amount sufficient to improve the efficiency of said rumen fermentation.

2. The method of claim 1 wherein the compound is 3-trichloromethyl-5-ethoxy-1,2,4-thiadiazole.

3. The method of claim 2 wherein said ruminant animals are cattle or sheep.

4. The method of claim 2 wherein said compound is administered to said ruminant animals at a rate of from about 0.1 mg/kg of animal body weight per day to about 4 mg/kg of animal body weight per day.

5. The method of claim 2 wherein said compound is administered to said ruminant animals at a rate of from about 0.2 mg/kg of animal body weight per day to about 3 mg/kg of animal body weight per day.

6. The method of claim 4 wherein said compound is administered in admixture with a standard ruminant animal feed.

7. The method of claim 5 wherein said compound is administered in admixture with a standard ruminant animal feed.

8. A method for improving the efficiency of rumen fermentation in ruminant animals which comprises administering to said animals a ruminant animal feed composition containing from about 15 to about 110 parts per million by weight of the ultimate composition of 3-trichloromethyl-5-ethoxy-1,2,4-thiadiazole.

9. The method of claim 8 wherein said ruminant animals are cattle or sheep.

* * * * *